US006887452B1

(12) United States Patent
Pecoraro et al.

(10) Patent No.: US 6,887,452 B1
(45) Date of Patent: May 3, 2005

(54) SYSTEM AND METHOD FOR PRECIPITATING SALTS

(75) Inventors: Thomas Anthony Pecoraro, Plainfield, IL (US); Steven Oshen, Glen Ellyn, IL (US)

(73) Assignee: United States Filter Corporation, Palm Desert, CA (US)

( * ) Notice: Subject to any disclaimer, the term of this patent is extended or adjusted under 35 U.S.C. 154(b) by 977 days.

(21) Appl. No.: 09/702,494

(22) Filed: Oct. 31, 2000

(51) Int. Cl.[7] .............................................. C01B 17/62
(52) U.S. Cl. ..................................... 423/519; 423/539
(58) Field of Search ................................ 423/519, 184, 423/158, 160, 161, 539

(56) References Cited

U.S. PATENT DOCUMENTS

| | | | |
|---|---|---|---|
| 1,191,108 A | | 7/1916 | Kestner |
| 2,277,778 A | * | 3/1942 | Merle .......................... 423/307 |
| 3,137,544 A | * | 6/1964 | Karl ............................ 422/252 |
| 3,860,695 A | | 1/1975 | Metzger et al. .............. 423/519 |
| 3,960,502 A | | 6/1976 | Saeman ...................... 23/273 R |
| 3,995,015 A | * | 11/1976 | Bean ........................... 423/519 |
| 4,255,401 A | * | 3/1981 | Nomoto et al. .............. 423/235 |
| 4,294,807 A | * | 10/1981 | Randolph ............... 423/243.11 |
| 4,844,880 A | * | 7/1989 | Bean et al. .................. 423/519 |
| 5,733,517 A | * | 3/1998 | Owens et al. ............. 423/242.3 |
| 5,753,200 A | * | 5/1998 | Zolotoochin et al. ....... 423/519 |
| 5,770,164 A | * | 6/1998 | Moser et al. ................ 422/171 |
| 5,976,485 A | * | 11/1999 | Zolotoochin et al. ....... 423/519 |
| 6,416,729 B1 | * | 7/2002 | DeBerry et al. .......... 423/573.1 |

OTHER PUBLICATIONS

Perry's Chemical Engineers' Handbook, 7th ed. (Robert H. Perry, Don W. Green and James O. Maloney, eds., 1997), pp. 14-4 –to14-61; pp. 18-44 to 18-55; and pp. 19-18 to 19-20.

* cited by examiner

Primary Examiner—M. Alexandra Elve
(74) Attorney, Agent, or Firm—Lowrie, Lando & Anastasi, LLP

(57) ABSTRACT

A system and method for producing salts using a crystallizer with an integrated column is disclosed. In the column, liquid, containing one reactant, absorbs a second reactant, from the gas stream. The second reactant reacts with the first reactant to produce salt. Liquid leaving the column and rich in salt, collects in the crystallizer. Conditions within the crystallizer promote nucleation and crystal growth. A recirculation system withdraws a portion of liquid from the crystallizer for introduction into the column.

35 Claims, 7 Drawing Sheets

SYSTEM AND METHOD FOR PRECIPITATING SALTS

BACKGROUND OF THE INVENTION

1. Field of the Invention

The present invention relates to a system and method for producing salts in a crystallizer having an integrated column and, more particularly, for producing sodium metabisulfite.

2. Description of the Related Art

Various additives can be added to food and beverage products to preserve them from spoilage. For example, the use of sulfur dioxide ($SO_2$) in winemaking dates back several thousand years. In earlier times, sulfur dioxide was introduced into wine by burning elemental sulfur in a container intended to contain wine. As wine was introduced to the container, the sulfur dioxide would dissolve in the wine as sulfite and protect the wine from oxidation. Today, pure salts of sulfur dioxide may be used. One such salt is sodium metabisulfite ($Na_2S_2O_5$), also referred to as sodium pyrosulfite. Sodium metabisulfite has multiple alternative uses, for example, as a photographic developer, in chrome tanning of leather, in the manufacture of dyes and chemicals, as a bleach, a reducing agent for emulsion, rayon and paper and in the medical industries.

Salts, such as sodium metabisulfite, are typically produced by precipitation reactions and generally crystallize to form an orderly and repetitive arrangement of salt molecules. Crystal formation first involves nucleation of a solid phase from a liquid phase followed by crystal growth, the orderly addition of the molecules. Supersaturation is the driving force effecting this phase change.

Salt crystals have been made using several systems and methods. Various methods of crystallization are discussed in *Perry's Chemical Engineers' Handbook*, 7th ed. (1997) edited by Robert H. Perry, Don W. Green and James O. Maloney. Batch crystallization, for example, involves the charging of a concentrated or near-saturated solution followed by a time controlled cooling or evaporation of the solvent. In some processes, the resulting solution can then be artificially seeded. At the end of the cycle, the slurry may be filtered or dried to recover the crystals.

Another method involves the use of a continuous forced-circulation evaporative crystallizer. The process includes introducing a feed salt solution to the body of an evaporative crystallizer. A slurry solution is withdrawn from the body of the crystallizer and heated, typically with a heat exchanger or heating element. The heated slurry is returned to the body and mixes with the slurry body and raises the slurry body temperature locally near the point of entry causing boiling at the liquid surface. The consequent cooling and vaporization results in increasing saturation and promotes crystal precipitation in the crystallizer.

A crystallizer may use mechanical circulation or agitation. In an agitated crystallizer, an impeller agitates the slurry to promote nucleation and growth. Crystals eventually settle to the bottom of the crystallizer body in the settling zone. Above the settling zone is a region of supernatant liquid relatively free of crystals. A circulation pump withdraws supernatant liquid and feeds it to a heating element sufficiently sized to compensate for evaporative cooling.

Reactive crystallizers take advantage of the phase change created by the product of a chemical reaction. For example, in producing ammonium sulfate crystals, gaseous ammonia is introduced into the reactive crystallizer. Simultaneously, sulfuric acid is introduced at the bottom of the crystallizer body and is mixed with mother liquor where it reacts with the ammonia to produce ammonium sulfate salt. Ammonium sulfate crystals precipitate and settle at the bottom of the crystallizer body.

In Saeman, U.S. Pat. No. 3,960,502, an absorber-crystallizer tower with means for spraying aqueous solution into a reactive gas to saturate the solution from which the product crystallizes is described. The apparatus also has an improved means for removing scale from the crystal containing suspension.

One method of producing sodium metabisulfite disclosed by Metzger et al., U.S. Pat. No. 3,860,695, includes adding sodium hydroxide to a gas-free reaction medium. Flue gas, containing sulfur dioxide, is contacted with a reaction medium using a Venturi scrubber whose outlet is submerged in a reaction medium containing sulfur dioxide. This reaction produces sodium metabisulfite. The sodium metabisulfite crystals may be then allowed to settle.

Another method of producing sodium metabisulfite disclosed by Zolotoochin, U.S. Pat. No. 5,976,485, involves introducing sulfur dioxide into a solution of sodium sulfite and sodium bisulfite to produce sodium bisulfite in a solution containing dissolved sulfur dioxide. The solution is transferred to a crystallizer where it is cooled while mixing with an alkali to produce sodium metabisulfite.

In Bean, U.S. Pat. No. 3,995,015, a process for the manufacture of sodium metabisulfite from sulfur dioxide and sodium carbonate is described. The process of Bean involves passing the sulfur dioxide containing gas serially through two reaction media where the first reaction is maintained under strongly acidic conditions and the second reaction is maintained under strongly alkaline conditions. The first reaction medium contains an acidic aqueous solution of sodium metabisulfite. The second reaction medium contains alkaline aqueous slurry of sodium carbonate. Sulfur dioxide gas is introduced in the first reaction medium. Unabsorbed sulfur dioxide gas is introduced into the second aqueous reaction medium to form sodium sulfite. Sodium carbonate is introduced into the second reaction medium to maintain alkalinity. An alkaline aqueous dispersion of sodium carbonate containing sodium sulfite and sodium carbonate from the second reaction medium is transferred to the first reaction medium. A solution from the first reaction medium overflows to the second reaction medium. A solution of sodium metabisulfite containing suspended sodium metabisulfite crystals is withdrawn from the first reaction medium for crystal separation. The crystal-free solution is returned to the first aqueous reaction medium.

In another patent to Bean, U.S. Pat. No. 4,884,880, sodium carbonate and sulfur dioxide gas react in a vessel. The resultant solution then flows into a crystallizer where it is cooled to precipitate sodium metabisulfite.

SUMMARY OF THE INVENTION

The present invention relates to a system for precipitating salt comprising a column and a crystallizer in communication with the column. The system also includes at least one inlet in communication with the column and the crystallizer as well as at least one salt outlet positioned at the bottom of the crystallizer. Further, the column has at least one internal element.

The present invention also relates to a method for precipitating salts comprising flowing a first stream containing a first reactant in a column and introducing a second stream containing a second reactant into the column. The method further includes transferring a portion of the second reactant into the first stream and reacting the second reactant with the first reactant to produce a salt stream. Additionally, the method involves precipitating the salt from the salt stream.

In another embodiment, the invention relates to a system for precipitating sodium metabisulfite comprising a crystallizer having at least one sodium metabisulfite outlet and at least one column in communication with the crystallizer. The column includes at least one internal element. Further, the system comprises at least one sulfur dioxide inlet in communication with at least one of the column and the crystallizer.

In another embodiment, the invention relates to a system for precipitating sodium metabisulfite comprising a crystallizer having at least one sodium metabisulfite outlet and an agitation-suspension system. The system also has at least one column in communication with the crystallizer and has at least one internal element. The system further includes at least one recirculation system in communication with the crystallizer and the column. Moreover, the system has at least one sodium alkali inlet in communication with the recirculation system and at least one sulfur dioxide inlet in communication with at least one of the column and the crystallizer.

In another embodiment, the invention relates to a method for producing sodium metabisulfite. In particular, the method comprises introducing a gas stream, having sulfur dioxide, and a liquid stream, having sodium sulfite and water, into a column. The method also comprises absorbing at least a portion of the sulfur dioxide into the liquid stream and reacting at least a portion of the absorbed sulfur dioxide with sodium sulfite to produce a sodium metabisulfite stream. The method further involves evaporating at least a portion of the water from the liquid stream into the gas stream. The method also comprises precipitating sodium metabisulfite from the sodium metabisulfite stream in a crystallizer and withdrawing a slurry of sodium metabisulfite from the bottom of the crystallizer.

In yet another embodiment, the invention relates to a system for precipitating salts comprising a column having at least one internal element, a crystallizer, in communication with the column, and a recirculation system, in communication with the crystallizer and the column. The system also has a mixing slurry tank in communication with the recirculation system and the column. Further, the system has at least one gas outlet positioned in the column and at least one salt outlet positioned in the crystallizer. The system has a slurry of salt in the crystallizer having a substantially uniform pH. The system also has a liquid stream having a first reactant flowing substantially downwardly within the column and a gas stream having a second reactant flowing substantially countercurrently against the liquid stream. Additionally, the system has a first feed inlet in communication with the column supplying the first reactant and a second feed inlet in communication with the mixing slurry tank supplying a third reactant.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

Figure 1:
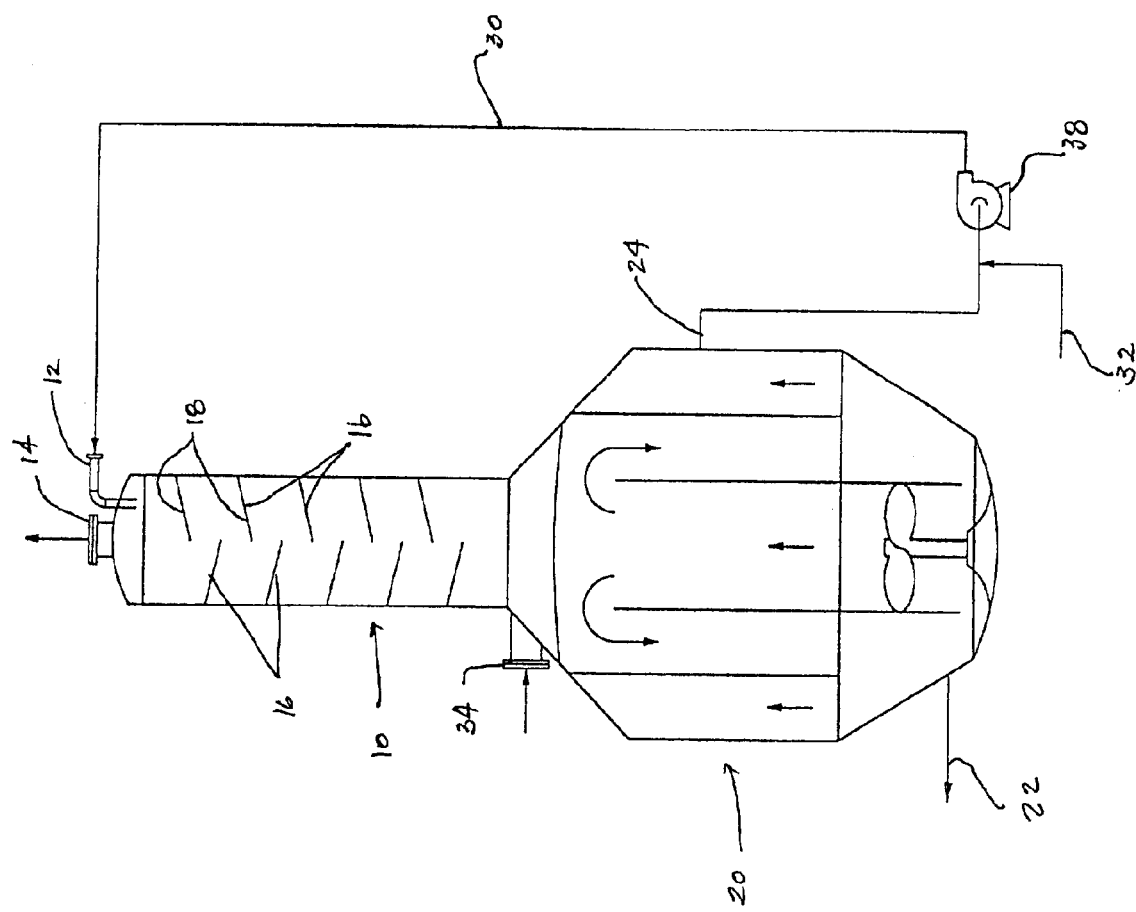
FIG. 1 represents a general flow diagram of a system for precipitating salts of the present invention.

The invention is directed to a system and method for crystallization of an organic or inorganic salt from the reaction of gas, liquid or solid compounds. The system includes a crystallizer with an integrated column for continuous salt crystallization that may use supersaturation to promote crystallization. In particular, the system can create supersaturation conditions with minimal ancillary utility costs. Further, by obtaining large crystal sizes, high quality salts may be obtained at lower purification costs. Similarly, the method of the invention provides a process for supersaturating a salt stream and promoting crystallization of salt product.

In a column, absorption, evaporation, mass transfer, precipitation, reaction or phase change may occur between two or more flowing streams. The column may contain at least one internal element to improve contact between flowing streams and facilitate at least a portion of the mass transfer. In particular, a liquid stream, flowing substantially downwardly, may contact countercurrently a gas stream and absorb at least one chemical species on at least one internal element. Likewise, evaporation may occur from the liquid to the gas on at least one internal element.

Moreover, at least one chemical reaction may occur in at least one of the streams producing at least one product. Specifically, the chemical reactions may produce at least one salt. In one embodiment of the invention, at least one reactant in the gas transfers into the liquid and reacts with at least one reactant in the liquid to produce a salt. If the liquid becomes supersaturated, the salt may precipitate on the internal elements of the column which may lead to accumulation and clogging and reduce the tray efficiency and column effectiveness. However, the salt may remain dissolved in the liquid because precipitation is inhibited. To prevent undesired precipitation, the column may be operated under conditions that limits crystal precipitation. Thus, in one embodiment, the column may be operated with a high liquid flow so that any precipitation will not accumulate and clog the column.

In addition, the column may have internal elements suitably designed to inhibit crystal deposition, precipitation or accumulation. Specifically, if the chemical reactions in the stream produce salt precipitate, the internal elements may be designed to promote shedding of any precipitated product so that liquid flowing over the internal elements wash down the salt before accumulation and clogging occurs.

The design of the column also requires a consideration of the number of theoretical stages necessary to obtain the desired conversion A theoretical stage is defined as an ideal or hypothetical section of the column wherein liquid and gas leaving that stage are in thermodynamic equilibrium. The number of actual or installed internal elements is a function of the number of theoretical stages. In particular, the number of internal elements is a product of the number of theoretical stages and the efficiency of the internal elements. So, in one embodiment, the column has at least one theoretical stage. Preferably the column has at least two theoretical stages. Correspondingly in one embodiment, the column has at least one internal element wetted by the process fluids and preferably, the column has at least two internal elements.

In one arrangement, the column has one type of internal element. In yet another embodiment, the column has a combination of types of internal elements. Internal elements vary in design, shape and size depending on application. The internal elements may be baffle trays such as shed trays with surfaces having downward slope designed and constructed to shed precipitated salt. Flat trays may be used especially where the amount of precipitated crystals is small and there is sufficient liquid traffic to shed or wash down the precipitated crystals. In another embodiment, the internal elements may be disk and donut type trays where the liquid cascades over alternating disk and donut shaped trays. In yet another embodiment, the internal elements may be sieve trays or perforated trays. In still another embodiment, the internal elements may be flat plates in a half-moon shape that may be attached to the inside wall of the column. Alternatively, the trays may be formed in any of a variety of plane geometric figures, for example, rings of various inside opening dimensions, discs with straight, scalloped, or sawtoothed edges, circular discs creased along a diameter or a chord to create two or more downward sloping surfaces where the downward angle of the sloping surface can range from about 1° to about 90° relative from the horizontal datum, to facilitate shedding or carrying away any precipitated salts. In yet another embodiment, the internal elements may be ordered packing elements such as grid trays, or the internal elements may be random packing materials.

Further, the column may be operating below, near or just above atmospheric pressure. Specifically, the column may be pressurized thus reducing, or in certain situations, eliminating the need for a pump to transfer the liquid to the crystallizer as, for example, when there is sufficient head pressure to overcome line pressure drop from the column to the crystallizer. Operating the column under vacuum pressure conditions may facilitate mass transfer from the liquid to the gas. This operation may assist in purifying one fluid stream or enriching another fluid stream by increasing the pressure differential between the phases, which in turn, increases the rate of transfer. As used herein, vacuum pressure means pressure below atmospheric pressure. Alternatively, the column may be pressurized so that the internal pressure of the column is greater than atmospheric pressure.

The column may be operated isothermally or with a temperature gradient running along its length. The choice of operating temperatures may be dependent on a particular process and may be selected to promote or inhibit a phase change, such as precipitation, or a reaction.

In one embodiment, a number of columns may be operated in series or in parallel flow connection so that fluid may be pumped or drained to the crystallizer. In one arrangement, several columns may be subjected to identical process conditions and may be arranged in parallel. In another instance, several columns may have a diversity of processes arranged in either parallel, series or cross-flow pattern where fluid streams from one column cross with fluid streams from a second column cross into a third column or even a fourth column.

In another embodiment, the column may have a water wash to remove any solid accumulation that may occur. The water wash may consist of a spray or series of spray nozzles located near the top of the column to allow water to dissolve or rinse and wash down solid accumulation.

The crystallizer of the system collects the liquid leaving the column and promotes salt nucleation and crystal growth. The crystallizer provides the residence time for nucleation of a solid phase from the liquid phase and for the orderly and repetitive addition of salt molecules to obtain larger crystal size. In particular, the crystallizer may retain the liquid and precipitated salt as a slurry.

To promote and enhance uniformity of salt crystal growth, the crystallizer may include at least one agitation-suspension system which allows uniformity of temperature, concentration and pH. In one embodiment, the agitation-suspension system includes at least one agitator. In another embodiment, the agitation-suspension system may include a partitioned internally circulated system to effect internal circulation and clarifying. Specifically, the partitioned internally circulated system includes a draft tube around the agitator, and a partitioning skirt. Because the draft tube may extend below the fluid level, the fluid may flow within the draft tube and circulate over and downward, around the outside of the draft tube. The partitioning skirt may be positioned between the draft tube and the crystallizer wall to contain the internal fluid circulation while isolating a supernatant fluid. The supernatant fluid typically entrains smaller precipitated crystals, or fines, relative to the larger settled crystals.

In another embodiment, the agitation-suspension system fluidizes the slurry by recirculating the slurry using a downcomer, essentially an extension of the column into the slurry, so that the liquid, at a sufficient rate, flowing down from the column creates the mechanical agitation and suspends the slurry. Alternative means of maintaining homogeneity of the crystallizer liquid may include the use of a recycle line drawing supernatant fluid from the crystallizer and then forcibly returning the fluid to promote mixing at high flow rates compared to the contained volume in the crystallizer.

In another configuration, the crystallizer may have a gas zone above the liquid level from which vacuum may be applied. If the column is directly connected to the crystallizer, the column walls may extend below the crystallizer liquid level to isolate the gas fluid flowing in the column from the gas zone above the crystallizer liquid. The vacuum reduces the pressure above the supernatant fluid in the crystallizer which may promote evaporation of liquid into the vapor phase. This mechanism increases the product concentration to a point of supersaturation that may help force crystallization. The vapor recovered from the vacuum system may be then be reintroduced into the column or with a gas inlet.

As with the column, the crystallizer may be operated in a range of pressure or temperature conditions. Thus, in one embodiment, the contents of the crystallizer may be at, below or above 0° C. Also, the pressure within the crystallizer may be at, below or above atmospheric pressure. Further, in another embodiment, the column and the crystallizer may be operated at substantially the same pressure.

Slurry, typically referred to as magma, containing the salt crystals may be withdrawn from the bottom of the crystallizer. The bottom of the crystallizer may be flat, hemispherical or cone shaped with at least a 10-degree slope, preferably at least 30-degree, more preferably at least 45-degree, and more preferably still at least 60-degree for easier withdrawal of the slurry from the bottom of the crystallizer. The slurry density, defined as the relative quantity of solids in the slurry, by weight or volume, may be affected by, for example, the agitation rate, the retention time of the crystals, the slurry withdrawal rate, and the production rate. In some instances, the slurry density correlates proportionately to crystal size. The slurry may be filtered, dried or centrifuged to remove carried liquid and retrieve the crystal product. The recovered liquid may be returned to the crystallizer, the column or a recirculating system.

The crystallizer may further include at least one supernatant outlet for liquid withdrawal. In particular, liquid may be withdrawn from the crystallizer into at least one recirculation system to promote the destruction of fines and for supplying at least a portion of the liquid to the column as a medium for absorption and reaction. Thus, in operation, withdrawing the fines from the population of available growth sites leaves only the larger crystals as growth sites. Consequently, growth crystals is favored over smaller crystals.

In one embodiment, the recirculation system further includes at least one inlet capable of introducing at least one reactant. Alternatively, a portion of liquid in the recirculation system may feed into at least one intermediate vessel or mixing slurry tank where at least one reactant may be introduced to mix or react with the liquid. This mixing slurry tank may be a mixing vessel, tank or a reactor with at least one tank inlet, at least one reactant inlet and an agitator or circulator to promote homogeneity. Liquid from the mixing slurry tank may then be transferred back into the recirculation system and introduced into the column as a portion of the column liquid. The liquid from the recirculation system may be introduced near the top of the column and above the column internal elements or at intermediate heights along the column.

Further, the recirculation system may include at least one energy transfer unit operation to heat or cool the recirculation liquid. Specifically, the recirculation system may include at least one heat exchanger, heater or cooler.

According to need, the system components may be constructed of any suitable material structurally capable of maintaining internal pressure, supporting the column weight, internal components and attachments such as nozzles, manways, insulation, instrumentation, ladders, valves, etc. In one embodiment, the system may be used to produce products suitable as food additives necessitating the use of inert or non-corrosive material, relative to the process fluid, such as glass, stainless steel or a combination for all process-wetted parts. The term process-wetted part may be defined herein to mean that process fluids, liquid, gas or solids, directly contact the wall or surface of the part. In one embodiment, the components may be constructed entirely of the non-corrosive material or may be lined such that only the lined surfaces directly contact the process fluid. For example, the column may be lined with glass and have trays of polytetrafluorethylene, supported by stainless steel rods with a stainless steel crystallizer.

FIG. 1 embodies some features of the invention and illustrates a generalized flow diagram of the system. A column 10 is shown positioned above a crystallizer 20 having at least one product outlet 22 and a supernatant outlet 24. At least one liquid enters the column through at least one column liquid inlet 12 located near the top of the column. The column contains at least one internal element shown as trays 16 with at least one downwardly sloping surface 18 where liquid cascades from one tray down to the next. The system further includes at least one feed inlet 34 supplying at least one gas stream with at least one reactant. Typically, the gas stream flows countercurrently against the liquid stream over the internal elements so that at least one species, reactant, product, by-product or solvent transfers from at least one stream to another. At least one reaction in at least one stream consumes at least one reactant and produces at least one product. The gas stream exits near the top of the column through at least one vent outlet 14.

The figure also shows a crystallizer with at least one agitation-suspension system to promote mixing of the liquid collected from the column. The crystallizer may promote at least one phase change or crystallization of at least one product or salt to form a slurry. The figure also shows at least one product outlet 22 near the bottom of the crystallizer.

The system may also include at least one recirculation system with at least one recirculation pump 38 drawing supernatant liquid from the crystallizer through at least one supernatant outlet 24 and supplying at least one recirculation line 30. The recirculation system includes at least one reactant inlet 32 wherein at least one reactant may be introduced. The recirculation system is shown supplying the column liquid through at least one liquid inlet 12. In practice, a person of ordinary skill may utilize the features of the invention to produce ammonium salts, such as ammonium sulfate, from ammonia reactions with sulfuric acid or sulfur oxide; bicarbonate salts, such as sodium bicarbonate, from carbon dioxide reactions with sodium carbonate or sodium hydroxide and carbon dioxide; sulfate salts from sulfur oxide; chloride salts from hydrogen chloride reactions or sulfite salts from sulfur dioxide reactions.

Figure 2:
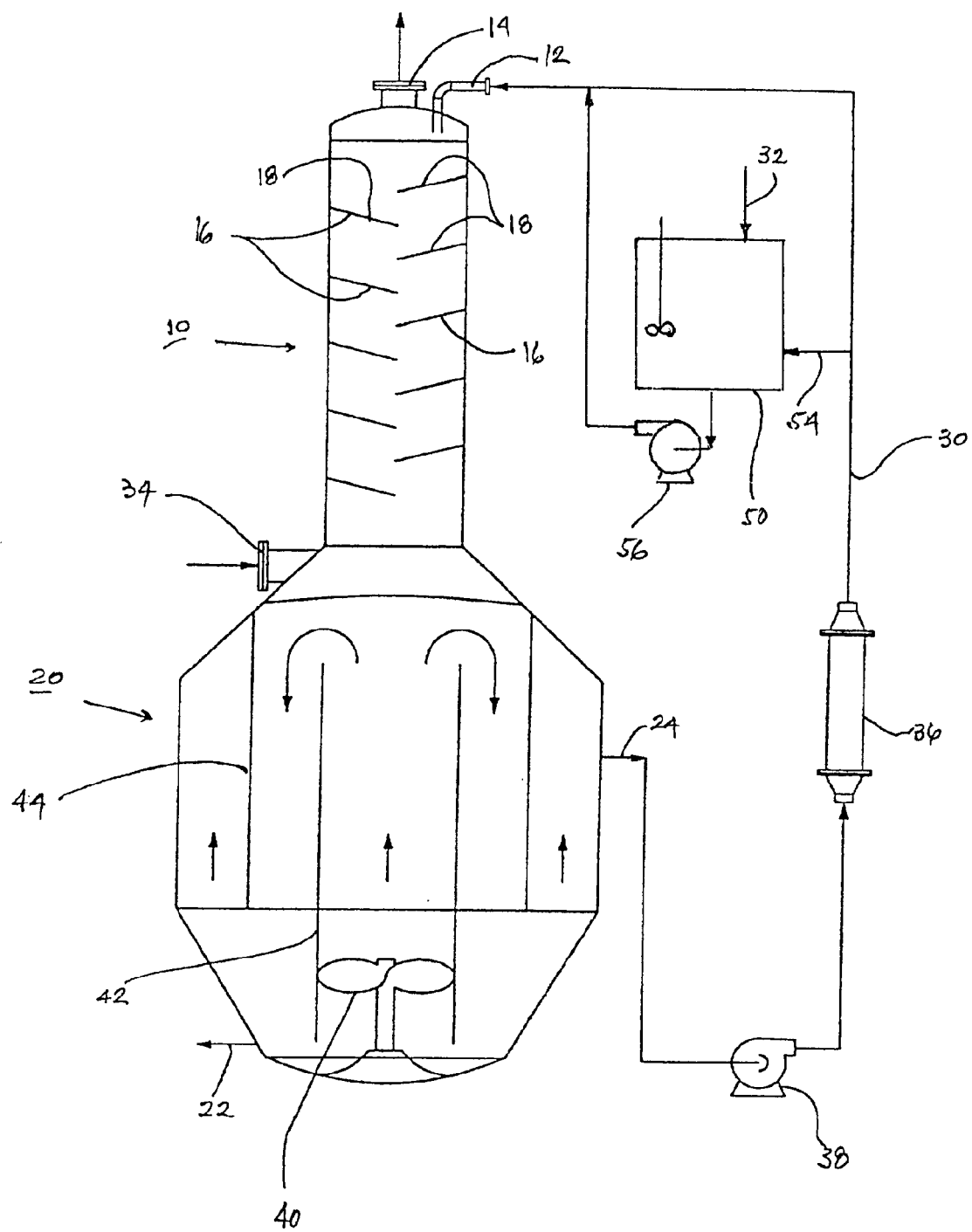
FIG. 2 is another schematic diagram of a system of the present invention.

In one embodiment illustrated in FIG. 2, sodium metabisulfite salt is produced from sulfur dioxide and a sodium alkali. Sulfur dioxide is found in significant amounts as a constituent of various waste gases from chemical plants or from stack or furnace gases from coal or oil-burning electric power plants. Alternatively, burning sulfur or pyrite ($FeS_2$) may produce sulfur dioxide. This sulfur dioxide gas stream may contain 1% to 20% sulfur dioxide with the majority of the balance being nitrogen. Various sodium alkalis may be used such as caustic soda or sodium hydroxide (NaOH), soda ash or sodium carbonate ($Na_2CO_3$) and sodium bicarbonate. When sodium carbonate is used as the sodium alkali, the reaction of sulfur dioxide with sodium carbonate proceeds according to the following equations.

$$Na_2CO_3 + Na_2S_2O_5 \rightarrow 2Na_2SO_3 + CO_2 \quad (1)$$

$$2Na_2SO_3 + 2SO_2 \rightarrow 2Na_2S_2O_5 \quad (2)$$

When sodium hydroxide is used as the sodium alkali, sodium metabisulfite may be produced according to the following equations.

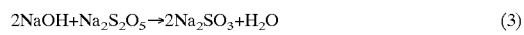

$$2NaOH + Na_2S_2O_5 \rightarrow 2Na_2SO_3 + H_2O \quad (3)$$

$$2SO_2 + 2Na_2SO_3 \rightarrow 2Na_2S_2O_5 \quad (4)$$

The column 10 operates isobarically or at substantially uniform pressure near atmospheric and at about the same pressure as the crystallizer 20. Flue gas containing at least 1% sulfur dioxide, preferably at least 10%, more preferably at least 15%, enters the system through inlet 34 located below at least one internal element shown as trays 16 with at least one downward sloping surface 18. Preferably, the column has at least two theoretical stages corresponding to at least two internal elements or at least two trays. Gas flows upwards and contacts liquid flowing downward over the trays. The liquid containing sodium sulfite absorbs at least a portion of the sulfur dioxide. The sulfur dioxide reacts with at least a portion of the sodium sulfite to produce sodium metabisulfite according to equation (4). Simultaneously, water or other by-product may evaporate into the gas, from the liquid, increasing the concentration of sodium metabisulfite. The system may be operated so that liquid flows at a rate sufficient to inhibit crystal deposition and to wash away any precipitated sodium metabisulfite salt.

Figure 3:
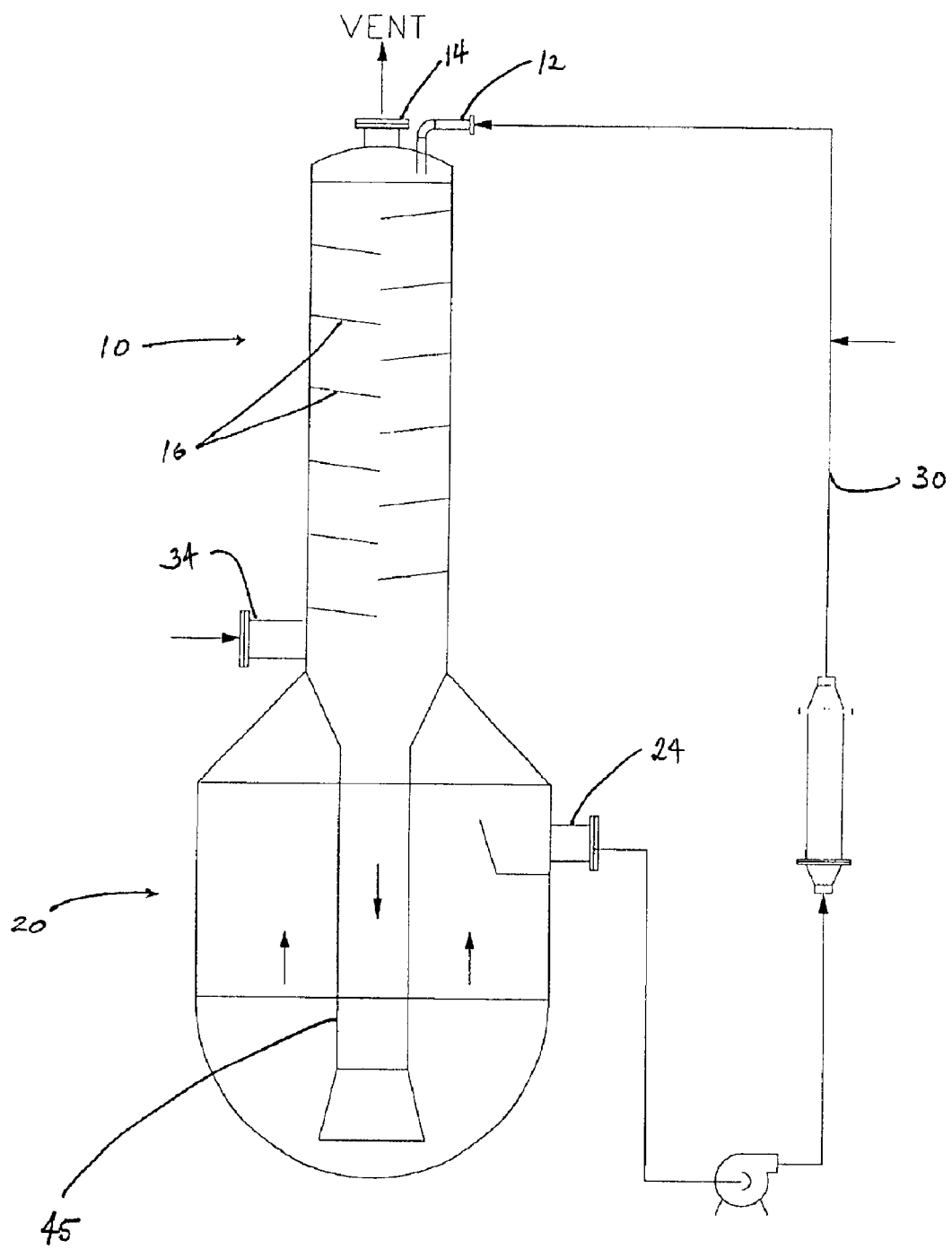
FIG. 3 shows another embodiment of the invention that uses a downcomer to agitate and suspend the precipitated salt.

The crystallizer includes at least one agitation-suspension system comprising a partitioned internally circulated system having an agitator 40, a draft tube 42 and a partitioning skirt 44. Alternatively, the agitation-suspension system may comprise a downcomer 45 that agitates and suspends the slurry as shown in FIG. 3. Further, slurry comprising sodium metabisulfite crystals may be withdrawn near the bottom of the crystallizer through outlet 22. Solids from the slurry may be filtered and dried and the recovered liquids may be reintroduced into the crystallizer, a recirculation system or the column.

The crystallizer also has at least one supernatant outlet 24 supplying at least one recirculation system having a recirculation line 30 through the recirculation pump 38. At least a portion of the liquid in the recirculation system is transferred to a sodium sulfite mixing slurry tank 50 through inlet 54. If sodium hydroxide is added to tank 50 through inlet 32, it mixes and reacts with the liquid containing sodium metabisulfite to produce sodium sulfite and water according to equation (3). Pump 56 withdraws a portion of the liquid containing sodium sulfite from tank 50 and transfers it to the recirculation system. Liquid in the recirculation system is introduced into the column above at least one internal element, preferably near the top of the column.

The recirculation system may further include a heating unit operation 36, such as a heater or a heat exchanger, to raise the temperature of the system. It may remain in operation during steady-state system operation if the overall system is endothermic or to facilitate destruction of small sized crystals. Alternatively, it may be isolated if the overall process is sufficiently exothermic.

Gas, comprising at least unreacted sulfur dioxide and evaporated by-product, may exit the column through at least one vent 14 near the top of the column. If there is a need to further reduce the sulfur dioxide concentration in the vent gas, the vent gas may be introduced into a scrubber (not shown).

The liquid and gas flow rate, temperature, pH or concentration of the reactants and products control the operation, including supersaturation, of the system. The pH of the fluids in the system may be controlled by, for example, temperature, flow of reactants or concentration of components, or by reaction of components. The pH may be constant along the length of the column or it may be discontinuous because of concentration changes from mass transfer, phase changes, fluid addition or fluid removal or because of temperature changes along the column. However, in one embodiment, the pH of the liquids is substantially the same. In an embodiment for sodium metabisulfite, the system is operated at a pH of 4.0 to 6.0 units, preferably at 4.2 to 5.0 units, and more preferably at 4.2 to 4.8 units. Further, the system may be operated to produce sodium metabisulfite at a temperature of at least 0° C., preferably at least 25° C., more preferably at least 50° C., and more preferably still, at least 70° C. The target operating slurry density is at least 6.3 wt. %, preferably at least 10 wt. %, more preferably at least 16 wt. %, and more preferably still at least 18 wt. %, in order to obtain large crystal size.

Crystal product quality may be characterized by considering, for example, purity and size. Crystal size may be analyzed for size distribution by standard sieve analysis and characterized according to relative percentage by weight of fractions retained on standard test sieves, such as the U.S. sieves series or the Tyler standard testing sieve series. A relative measure of the crystal size may be defined as the average crystal size, $D_{50}$. In one embodiment, larger crystal sizes are preferable because, for example, they create less dust, which, in turn, reduces irritation to those who may be exposed. Additionally, larger crystals may be less likely to cake together, which can complicate handling. In the embodiment for sodium metabisulfite production, the $D_{50}$ is at least about 100 microns, preferably at least about 180 microns, more preferably at least about 200 microns and more preferably still at least about 300 microns.

Purity may be characterized in terms of the composition of the desired product relative to unwanted impurities. In one embodiment the product purity is at least 90% sodium metabisulfite, preferably at least 98% sodium metabisulfite, more preferably at least 99% sodium metabisulfite, and more preferably still at least 99.7% sodium metabisulfite.

The invention may be further understood with reference to the following examples. These examples are intended to serve as illustrations and not as limitations of the present invention as defined in the claims herein.

EXAMPLE 1

A system for precipitating salts of sodium metabisulfite was assembled and operated using the principles of the invention and schematically illustrated in FIG. 2. The process utilized a crystallizer 20, a column 10 and a recirculation line 30. The crystallizer 20 was internally partitioned with an agitator 40 positioned at the vertical centerline of the crystallizer 20, a vertically running cylindrical draft tube 42 around the agitator and a cylindrical partitioning skirt 44 concentrically aligned with the draft tube 42 and the agitator. The agitator rotated at 700 rpm. As agitator 40 imparted vertical fluid flow by drawing from the bottom, the draft tube contained this flow until the end of the draft tube. At the end of the draft tube, the fluid flowed over and outside the draft tube but within the partitioning skirt 44, and mixed with liquid leaving the column.

The recirculation pump 38 withdrew supernatant from the crystallizer through a supernatant outlet 24 located just below the supernatant liquid level. The recirculation pump 38 transferred a portion of the supernatant liquid into an agitated sodium sulfite mixing slurry tank 50 through mixing slurry tank inlet 54. A sodium alkali solution of 50% sodium hydroxide was added to the sodium sulfite mixing slurry tank 50 through reactant inlet 32. The sodium hydroxide reacted with the sodium metabisulfite to produce sodium sulfite and water by-product, which was then introduced into the column via the recirculation system by sodium sulfite slurry pump 56 and through inlet 12. A start-up heater or heat exchanger 36 was placed inline with the recirculation line 30 to raise system temperature to reaction conditions. Once the system reached a stabilized temperature of about 150° F., the heater or heat exchanger was bypassed, and the system was operated without further external thermal energy input.

The column contained ten trays 16 with downwardly sloped surfaces 18. Flue gas containing sulfur dioxide at about 18 vol. % was fed through a supply inlet 34 below the trays 16 of the column 10. The gas exited the column 10 from vent outlet 14 at the top.

The system was operated at a temperature of 150° F. (65.6° C.), a pH of 4.5, a recirculation rate of 1.2 gallons per minute, a slurry density of 10 wt. %, and a production rate of about 5.5 pounds per hour.

Figure 4:
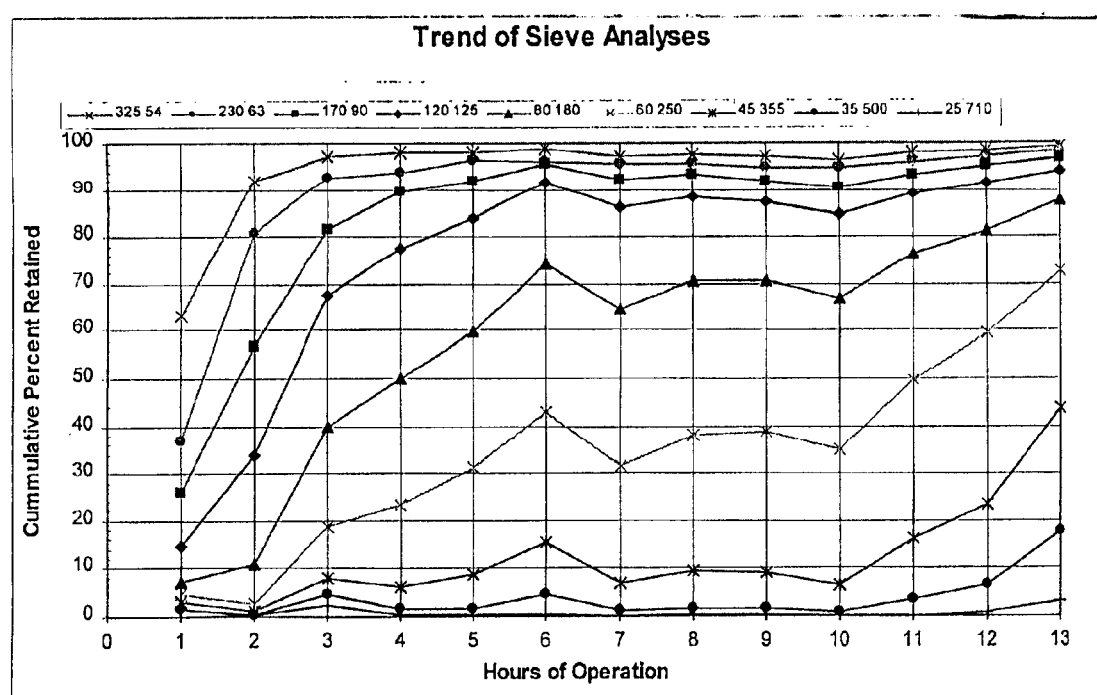
FIG. 4 shows a trend of sieve analysis illustrating crystal size distribution and growth trend.

Slurry samples were withdrawn and crystal size distribution was characterized using sieve tray tests. The test results are summarized in FIG. 4. The trend of FIG. 4 shows that during stable operation, the $D_{50}$ averaged about 220 microns and toward the end of operation, $D_{50}$ measured over 300 microns. It is believed that the $D_{50}$ increase was likely due to increased slurry retention time. No fouling or scaling on the column walls or trays was found except for a small amount at the tray support near the bottom of the column and on the bottom side of the last tray.

This example illustrates that the system and method using a column and a crystallizer operating at substantially the same temperature, pH and pressure may be used to precipitate salts with minimal utility requirements. In particular, sodium metabisulfite having a $D_{50}$ of about 300 microns may be produced.

EXAMPLE 2

In this example, the system and method for precipitation of salt was used with the intent to increase the product crystal size. The same system was utilized as in Example 1 and operated under essentially the same operating conditions except that the slurry density was increased to an average of 18.2 wt. % during the operation.

Figure 5:
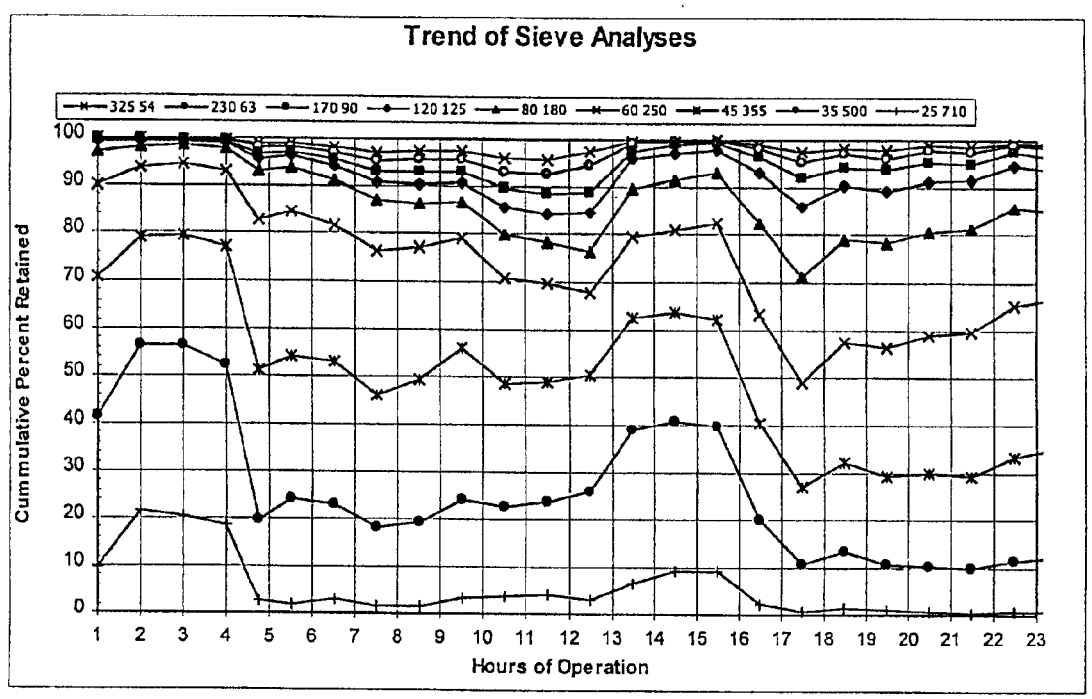
FIG. 5 shows another trend of sieve analysis illustrating crystal size distribution and growth trend.
Figure 6:
FIG. 6 is a photograph of precipitated sodium metabisulfite obtained from Example 2 at 40× magnification.
Figure 7:
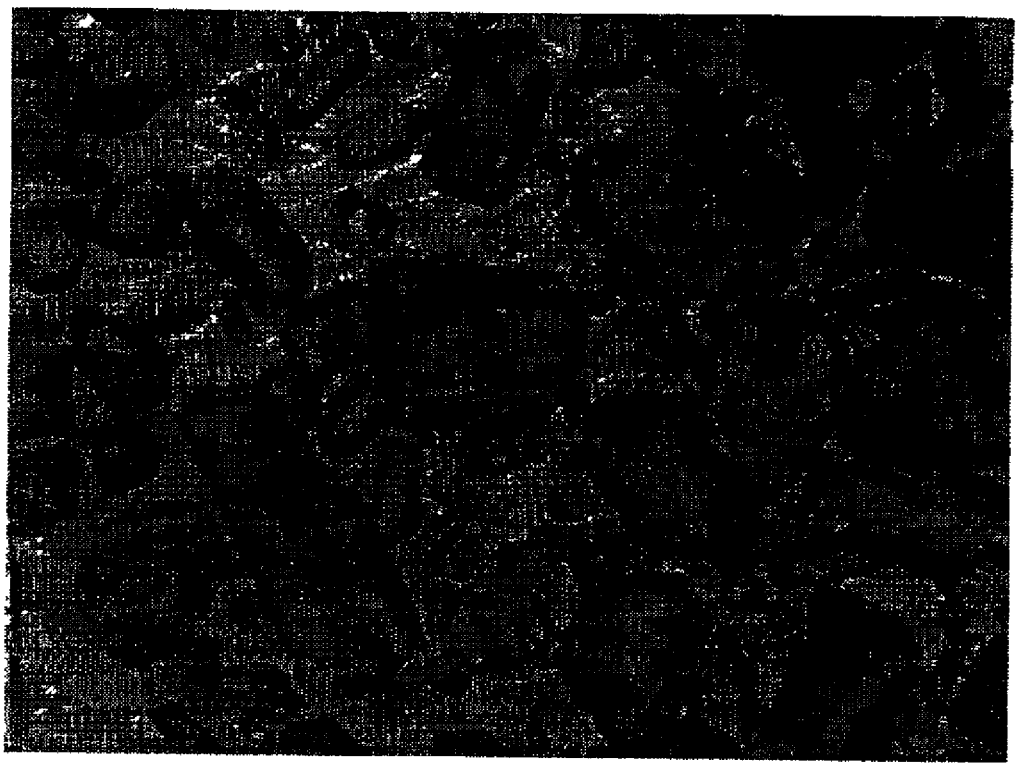
FIG. 7 is a photograph of commercial food grade sodium metabisulfite at 40× magnification.

Slurry was withdrawn periodically from the crystallizer and characterized. The results are illustrated in FIG. 5. Specifically, the trend of FIG. 5 shows the crystal size distribution with time. In particular, the trend shows that during the first 12 hours of operation, the $D_{50}$ averaged about 350 microns. During the next 12 hours, $D_{50}$ averaged 250 microns and then slowly increased to 300 microns. The trend shows that the $D_{50}$ increases with time and in particular, that the residence time or retention time of the crystals influences $D_{50}$. The salt was analyzed and found to be 99.7% sodium metabisulfite. Further, samples of the crystal product where visibly compared against commercially available sodium metabisulfite. FIG. 6 is a photograph at 40× magnification of the sodium metabisulfite product produced from the example. In contrast, FIG. 7 is a photograph, also at 40× magnification, of commercial food grade sodium metabisulfite. The sodium metabisulfite produced from this example is visually indistinguishable from the commercial food grade product.

This example shows that sodium metabisulfite crystals having $D_{50}$ about 300 microns at a purity of about 99.7% and indistinguishable from commercial sodium metabisulfite can be produced using the principles of the invention.

EXAMPLE 3

Several test runs were performed to determine the influence of pH and number of trays on system operation. The same system was used and operated as in Example 1 and 2 except that the pH and the number of trays were varied. Table 1, below, summarizes the results.

TABLE 1

Tray and pH influence on operating conditions.

| Test | Trays | pH | Recirculation Rate | Sulfur dioxide feed pounds/hr | Nitrogen feed pounds/hr | Sulfur dioxide absorbed pounds/hr |
|---|---|---|---|---|---|---|
| 1 | 10 | 4.5 | 1.2 | 3.8 | 7.5 | 1.84 |
| 2 | 20 | 4.5 | 1.2 | 3.5 | 7.5 | 1.95 |
| 3 | 20 | 4.8 | 1.2 | 3.7 | 7.5 | 2.94 |
| 4 | 20 | 4.5 | 2.0 | 3.6 | 7.5 | 2.08 |
| 5 | 20 | 4.5 | 1.2 | 3.9 | 8.1 | 2.24 |
| 6 | 20 | 4.8 | 1.2 | 3.7 | 7.3 | 3.10 |

The results show a correlation between absorbed sulfur dioxide, pH and number of trays. In particular, as the number of trays increases, the amount of sulfur dioxide absorbed also increases. Also, as the pH increases, the amount of sulfur dioxide absorbed also increases.

EXAMPLE 4

This example describes the design for a system and method for producing sodium metabisulfite on larger scale with production capabilities comparable to existing production systems. Flue gas containing sulfur dioxide enters near the bottom of a column and flows upward where it contacts countercurrent liquid traffic containing sodium sulfite over the trays having downwardly sloping surfaces. As the gas travels the length of the column, sulfur dioxide is absorbed by the liquid and reacts with the sodium sulfite in the liquid to form sodium metabisulfite and water by-product. Exiting flue gas from the column, vent gas, moves to a scrubber.

Liquid leaving the column containing sodium metabisulfite enters the crystallizer and mixes with the circulated and agitated slurry. Sodium metabisulfite slurry is circulated and fully mixed in a crystallizer having an agitator, a draft tube and a partitioning skirt assembly. Supernatant liquid is retrieved from the crystallizer and at least a portion is introduces to the sodium sulfite mixing slurry tank.

Sodium hydroxide is introduced into the sodium sulfite mixing slurry tank and reacts with the supernatant to produce sodium sulfite. The sodium sulfite slurry from the mixing slurry tank is introduced into the scrubber and scrubs the vent gas so that the sulfur dioxide concentration may be reduced to less than about 1 vol. %. Sodium sulfite slurry is transferred from the mixing slurry tank to the recirculation line where it mixes with the supernatant and enters the top of the column. Sodium metabisulfite slurry is pumped from the bottom of the crystallizer for filtering and purification.

The system operates at a pH of about 4.5 and a temperature of about 79.6° C. The scrubber operates at a pH of about 6.0. The wetted surfaces of the crystallizer, column, pumps, piping, slurry tank scrubber, heat exchanger is constructed from 316 stainless steel.

Specifically, the system was designed for a sodium metabisulfite production of 5,000 kg/hr, flue gas inlet at 8,288 $m^3$/hr with $SO_2$ concentration of 18 vol. %, sodium hydroxide at 50 wt. % inlet of 4,531 kg/hr, vent gas at 12,854 $m^3$/hr with $SO_2$ content of less than 1 vol. %.

Further modifications and equivalents of the invention herein disclosed will occur to persons skilled in the art using no more than routine experimentation and all such modifications and equivalents are believed to be within the spirit and scope of the invention as defined by the following claims.

What is claimed is:

1. A system for precipitating salt comprising:
   a column comprising at least one internal element positioned within the column;
   a crystallizer in communication with the column;
   at least one inlet in communication with the column and the crystallizer; and
   at least one salt outlet positioned at the bottom of the crystallizer,
   wherein the internal element comprises at least one tray having at least one downward sloping surface.

2. The system of claim 1 wherein the crystallizer further includes an agitating-settling system.

3. The system of claim 2 wherein the agitating-settling system comprises of a partitioned internally circulated system.

4. The system of claim 1 further comprising a recirculation system in communication with the crystallizer.

5. The system of claim 4 further comprising at least one reactant inlet in communication with the recirculation system.

6. The system of claim 2 further comprising a recirculation system in communication with the crystallizer.

7. The system of claim 6 further comprising at least one mixing slurry tank in communication with the column.

8. The system of claim 7 wherein the mixing slurry tank further comprises at least one reactant inlet.

9. The system of claim 1 wherein the column further includes a vent outlet in communication with a scrubber.

10. A system for precipitating sodium metabisulfite comprising:
    a crystallizer having at least one sodium metabisulfite outlet;
    at least one column in communication with the crystallizer;
    at least one internal element positioned within the column; and
    at least one sulfur dioxide inlet in communication with at least one of the column and the crystallizer,
    wherein the internal element comprises at least one tray having at least one downwardly sloping surface.

11. The system of claim 10 wherein the crystallizer further includes an agitation-suspension system.

12. The system of claim 11 wherein the agitation-suspension system comprises of a partitioned internally circulated system.

13. The system of claim 10 further comprising a recirculation system in communication with the crystallizer and the column.

14. The system of claim 13 further comprising a sodium alkali inlet in communication with the recirculation system.

15. The system of claim 11 further comprising a recirculation system in communication with the crystallizer and the column.

16. The system of claim 15 further comprising at least owe sodium sulfite mixing slurry tank in communication with the column.

17. The system of claim 16 further comprising a sodium alkali inlet in communication with the sodium sulfite slurry tank.

18. The system of claim 10 wherein the column further includes a vent outlet in communication with a scrubber.

19. A system for precipitating sodium metabisulfite comprising;
    a crystallizer having at least one sodium metabisulfite outlet and an agitation-suspension system;
    at least one column in communication with the crystallizer;
    at least one internal element positioned within the column;
    at least one recirculation system in communication with the crystallizer and the column;
    at least one sodium alkali inlet in communication with the recirculation system; and
    at least one sulfur dioxide inlet in communication with at least one of the column and the crystallizer,
    wherein the internal element comprises at least one tray with at least one downward sloping surface.

20. The system of claim 19 having at least one sodium sulfite mixing slurry tank in communication with the column.

21. The system of claim 20 wherein the column further includes a vent outlet in communication with a scrubber.

22. A method for producing sodium metabisulfite comprising:
    introducing a gas stream comprising sulfur dioxide into a column;
    introducing a liquid stream comprising sodium sulfite and water into the column;
    absorbing at least a portion of the sulfur dioxide into the liquid stream;
    reacting at least a portion of the sulfur dioxide with at least a portion of the sodium sulfite to produce a sodium metabisulfite stream;
    evaporating at least a portion of the water from the liquid stream into the gas stream;
    precipitating sodium metabisulfite from the sodium metabisulfite stream in a crystallizer; and
    withdrawing a slurry of sodium metabisulfite from the bottom of the crystallizer,
    wherein the column and the crystallizer are operated at substantially the same temperature.

23. The method of claim 22 further comprising agitating a slurry of precipitated sodium metabisulfite with a supernatant.

24. The method of claim 23 further comprising withdrawing a portion of the supernatant and adding a sodium alkali to at least a portion of the withdrawn supernatant to react with at least a portion of the sodium metabisulfite contained in the supernatant to produce sodium sulfite.

25. The method of claim 24 further comprising transferring the gas stream containing unreacted sulfur dioxide from the column and introducing it into a scrubber and removing a substantial portion of the unreacted sulfur dioxide.

26. The method of claim 25 wherein the sodium metabisulfite stream and the supernatant are maintained at about the same pH.

27. The method of claim 22 wherein the temperature is at least 25° C.

28. The method of claim 27 wherein the pH is maintained between 4.0 and 5.0.

29. The method of claim 28 wherein the precipitated sodium metabisulfite has a purity of at least 98%.

30. The method of claim 29 wherein the precipitated sodium metabisulfite has a $D_{50}$ of at least 180 microns.

31. The method of claim 30 wherein the temperature is at least 25° C., the pH is maintained between 4.0 and 5.0, the sodium metabisulfite has a $D_{50}$ of at least 180 microns and a purity of at least 98%.

32. The method of claim 31 wherein the temperature is at least 50° C., the pH is maintained between 4.3 and 4.8.

33. The method of claim 32 wherein the temperature is at least 70° C., the sodium metabisulfite has a $D_{50}$ of at least 300 microns.

34. A system for precipitating salts comprising:
- a column having at least one internal element;
- a crystallizer in communication with the column;
- a recirculation system in communication with the crystallizer and the column;
- a mixing slurry tank in communication with the recirculation system and the column;
- at least one gas outlet positioned in the column;
- at least one salt outlet positioned in the crystallizer;
- a slurry of salt contained in the crystallizer having a substantially uniform pH;
- a liquid stream having a first reactant flowing substantially downwardly within the column;
- a gas stream having a second reactant flowing in the column and substantially countercurrently against the liquid stream;
- a first feed inlet in communication with the column supplying the first reactant; and
- a second feed inlet in communication with the mixing slurry tank supplying a third reactant.

35. The system of claim 34 wherein the salt is sodium metabisulfite, the first reactant is sodium sulfite, the second reactant is sulfur dioxide and the third reactant is a sodium alkali.

\* \* \* \* \*